US010700951B2

(12) United States Patent
Syed et al.

(10) Patent No.: US 10,700,951 B2
(45) Date of Patent: *Jun. 30, 2020

(54) MULTI-APPLICATION SAAS METERING ENGINE

(71) Applicant: Corent Technology, Inc., Aliso Viejo, CA (US)

(72) Inventors: Shafiullah Syed, Saratoga, CA (US); Sethuraman Venkataraman, Thiruninravur (IN); Jeya Anantha Prabhu, Chennai (IN)

(73) Assignee: Corent Technology, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,868

(22) Filed: Apr. 17, 2019

(65) Prior Publication Data

US 2019/0253331 A1 Aug. 15, 2019

Related U.S. Application Data

(63) Continuation of application No. 14/814,625, filed on Jul. 31, 2015, now Pat. No. 10,305,761.

(60) Provisional application No. 62/031,712, filed on Jul. 31, 2014.

(51) Int. Cl.
*G06F 15/173* (2006.01)
*H04L 12/26* (2006.01)
*H04L 29/08* (2006.01)
*H04L 12/14* (2006.01)
*H04L 12/24* (2006.01)

(52) U.S. Cl.
CPC ............ *H04L 43/062* (2013.01); *H04L 67/22* (2013.01); *H04L 12/1432* (2013.01); *H04L 41/5096* (2013.01); *H04L 43/026* (2013.01); *H04L 43/067* (2013.01); *H04L 43/0817* (2013.01)

(58) Field of Classification Search
CPC ... H04L 43/062; H04L 43/026; H04L 43/067; H04L 43/0817; H04L 41/5096; H04L 67/22; H04L 12/1432
USPC .................................................. 709/224, 220
See application file for complete search history.

(56) References Cited

U.S. PATENT DOCUMENTS

| 8,326,876 | B1 | 12/2012 | Venkataraman |
| 9,058,600 | B1 | 6/2015 | Havemose |
| 10,305,761 | B2 * | 5/2019 | Syed ..................... H04L 43/062 |
| 2010/0005055 | A1 | 1/2010 | An |
| 2010/0005443 | A1 | 1/2010 | Kwok |
| 2014/0164603 | A1 | 6/2014 | Castel et al. |

FOREIGN PATENT DOCUMENTS

| WO | 2008042984 A2 | 4/2008 |
| WO | 2014078227 A2 | 5/2014 |

* cited by examiner

*Primary Examiner* — Philip B Tran
(74) *Attorney, Agent, or Firm* — Fish IP Law, LLP

(57) ABSTRACT

An accurate monitoring system for a multi-tenant system monitors each data stream of the multi-tenant system and determines the identity of the tenant using each of the data streams, and the application that the tenant is accessing. Aspects of each data stream are aggregated by a bucket aggregator to track and record trends for each tenant and/or each application. The aggregated data could be filtered, sorted, and reported for accurate subscription billing for each of the tenants and/or applications within a multi-tenant system.

10 Claims, 5 Drawing Sheets

MULTI-APPLICATION SAAS METERING ENGINE

This application is a continuation application of U.S. patent application Ser. No. 14/814,625, filed Jul. 31, 2015, and claims the benefit of priority to U.S. provisional application 62/031,712 filed on Jul. 31, 2014. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is software applications and services.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

Computer environments have evolved from localized single user systems to multi-user systems accessible by geographically distributed users. More recently, as cloud resources have become available, there has been a push to migrate one or more aspects (Computer power, memory, storage, etc) of what were previously localized systems into the cloud. This can be done for many reasons, including efficient allocation of resources, cost-effective scalability, improved reliability, improved security, and greater accessibility.

There are numerous issues that arise in executing such migrations, including especially time and cost. For example, many applications are not well suited to a particular cloud environment because (a) cloud environments and their resources are available in a wide variety of configurations and may not pair well with the application's requirements, (b) legacy applications may fail to take advantage of the additional resources offered by a cloud environment and/or (c) applications run inefficiently in a cloud. Before migrating local software applications into a cloud environment, it is helpful to match and compare a local software application's hardware, software, network, and other application environment resources with the resources of any cloud environments considered for migration. The matching and comparing reveals compatibility, costs, and other software migration factors that can serve as a basis for the selection of a proper cloud environment or environments.

Thus, there is still a need for systems and methods that efficiently adapt legacy software applications so they may take advantage of the resources and benefits of a cloud environment, including migrating non-tenant aware software applications into applications that can be operated in tenant applications in a SaaS (Software as a Service) environment. One particular need is to monitor and/or monetize user's consumption of cloud resources and/or SaaS services.

SUMMARY OF THE INVENTION

The inventive subject matter provides apparatus, systems and methods in which a usage of one or more computer resources are measured using a metering engine, an identity engine, a subscription engine, and a rendering engine. Preferably, the computer resources are measured in a multi-tenant system having a plurality of tenants using applications in an SaaS environment, where each application could be used by a plurality of tenants, and each tenant could use a plurality of applications.

The metering engine is preferably configured to measure at least one activity originating from the at least one computer resource. In some embodiments, the activities are data streams of the multi-tenant systems, and the metering engine monitors a plurality of data streams of the multi-tenant system, wherein each data stream corresponds to a user that is accessing an application in the multi-tenant system. The identity engine is preferably configured to identify at least one user whom initiated the at least one activity, from a group of users, for example a first user, a second user, a third user, and so on and so forth. Generally, each user has a unique identifier. The identity engine also preferably identifies the application that the user is accessing in the data stream. In this manner, when the identity engine analyzes the data stream between the user and the multi-tenant system providing the user access to the application, the identity engine could identify, from each data stream, which user is using which application.

A bucket aggregator could be used to aggregate activity for each user as a function of the plurality of data streams analyzed by the identity engine. The bucket aggregator could be configured to save information gleaned by the metering engine into separate "buckets" (e.g. memory locations in a non-transient memory) corresponding to each user, and/or each application in the multi-tenant system. Preferably, each user has a bucket for a time period—such as each day, each week, each month, and/or each year—such that the bucket aggregator creates a total activity aggregate of each user. In some embodiments, each application could also have a bucket for a time period, such that for a time period, the bucket aggregator creates a total activity aggregate of each application.

The subscription engine is preferably configured to generate a summary, based at least in part on the information gleaned from the metering engine and the identity engine, of the at least one activity associated with the at least one first user's usage of the at least one computer resource. In some embodiments the subscription engine could generate the summary gleaned from the bucket of total activity aggregate of each user, and/or each application. The metering, identity, subscription and rendering engines can be separate entities or combined in any suitable manner, and can operate on a specific individual or any combination of computer resources.

Of particular interest are systems and methods that measure aspects of user's data streams, for example, magnitude, duration and timing of the streams. In that manner, users are billed for actual use of the cloud resources, as opposed to block usage, for example pre-defined storage allowance, pre-set access hours or priority, maximum allocated FLOPS (Floating-point Operations Per Second). In SaaS environments, this can be embodied as differential billing for access to different sets of features.

Also contemplated are systems and methods that throttle user's access to cloud resources as a function of some circumstance, as for example, failure of a user to pay a bill on time, failure to comply with security or other protocols, and failure to comply with use restrictions.

Also contemplated is an identity database configured to store identity information of current users of the system.

Also contemplated is a billing engine configured to automatically interface with user's own billing systems (e.g. user's different instances of Quikbooks™).

Also contemplated is a notification system providing notifications to cloud operating personnel and/or users regarding status and use of cloud resources, comparison of resource usage and operational features between local and cloud operations, auditing of resource allocation and usage, billing issues, etc.

Viewed from another perspective, the inventive subject matter provides apparatus, systems and methods that matches local application requirements with cloud resources, transforms any SaaS service deficient application into SaaS capable applications, and non-tenant aware applications into at least appearance of tenant-aware applications, maps the applications efficiently to the cloud resources, and monitors and meters users consumption of cloud resources and SaaS services.

In order to assess the compatibility, benefits, and other software migration factors for migrating one or more locally operated software applications to one or more cloud environments, it is helpful if the modules of each application are mapped onto appropriate cloud environment resources. In order to provide a comprehensive analysis, it can be advantageous to generate as many maps of the application modules as possible, and then apply each module map to the cloud environment resources in as many variations as possible. Once a full list of possible configurations to map the application modules to the cloud environment has been generated, the user can select the most desirable configuration based time, speed, power, cost, or other performance factors.

Once a cloud environment or multiple environments have been selected for a single or multiple local software applications, each software application is preferably transformed to operate in each home cloud environment to facilitate the application (a) running efficiently in the cloud environment, and/or (b) taking advantage of additional resources offered by a cloud environment. Software applications can be individually re-written to resolve those issues, but it is often desirable to provide an automated process for transforming existing software applications (which might be locally based) to operate efficiently in a cloud environment. An automated process for transforming a locally operated software application into a cloud operated software application reduces the delay and cost required to migrate a local application into the cloud.

Once one or more locally operated applications have been migrated into the cloud and configured to operate in the cloud environment, most or even all operations or workloads engaged by the application will likely be performed by the cloud environment resources. In order to efficiently utilize cloud resources, it is helpful to first divide the application's workloads into related groups or partitions, and then assign each partition to a cloud resource. The assignment of partitions to cloud resources can be based on time, speed, power, cost, or other performance factors, that are most desirable for the user.

Once one or more software applications are available for operation in one or more cloud environments, it is desirable to measure and/or meter each user's use of any applications, and each application's use of cloud resources. This metering can be used to charge individual users and/or groups of users for the cost of cloud resources actually consumed by the users rather than based on storage limits, time limits, processor limits, or other forms of block billing. This metering can also be used to charge individual users of the same application separately, based on the user's actual use rather than block billing. This is beneficial because it allows cost sensitive users greater control over the cost of cloud based applications, and allows cloud operators to more efficiently assign and bill for available resources.

In one class of preferred embodiments, the inventive subject matter of the present application relates to the monitoring and metering of SaaS use for billing purposes. This includes SaaS environments comprising of multiple SaaS applications and multiple users of each SaaS application. The inventive subject matter also contemplates apparatus, systems, and methods for identifying data streams generated by a particular SaaS during use by a particular user or group of users. The data streams can be used to generate alerts and notifications based on defined rules, and can further be used to generate billing statements and initiate payment for services.

The inventive subject matter contemplates monitoring and metering multiple users over multiple software applications over multiple clouds, as well as individual users for single software applications in a single cloud.

The inventive subject matter further provides apparatus, systems and methods in which a common platform is shown to monitor multiple data streams that are captured from each SaaS application in an environment where there are multiple applications and several tenants are using every application. The tenant and application identity manager resolves the identity of the streams to distinguish and separate the data coming from different SaaS applications and from different tenants. The modules allow selection of specific streams and quantize the data based on rules. The quantized data may be checked for conditions as the basis for alerts and triggers to notify users of any action to be taken or invoke an automated system to make decisions and to change the operational control of a SaaS application. Also, the quantized streams are inspected by one or more subscription engines to determine if the users or tenants need to be charged for usage of resources beyond the limits specified by the rules for each user or group of users, tenant or group of tenants, and/or application or group of applications. The subscriptions engines may interface with billing services to fulfill the payment methods chosen by the users.

In interpreting descriptions in this Specification, groupings of alternative elements or embodiments of the inventive subject matter are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
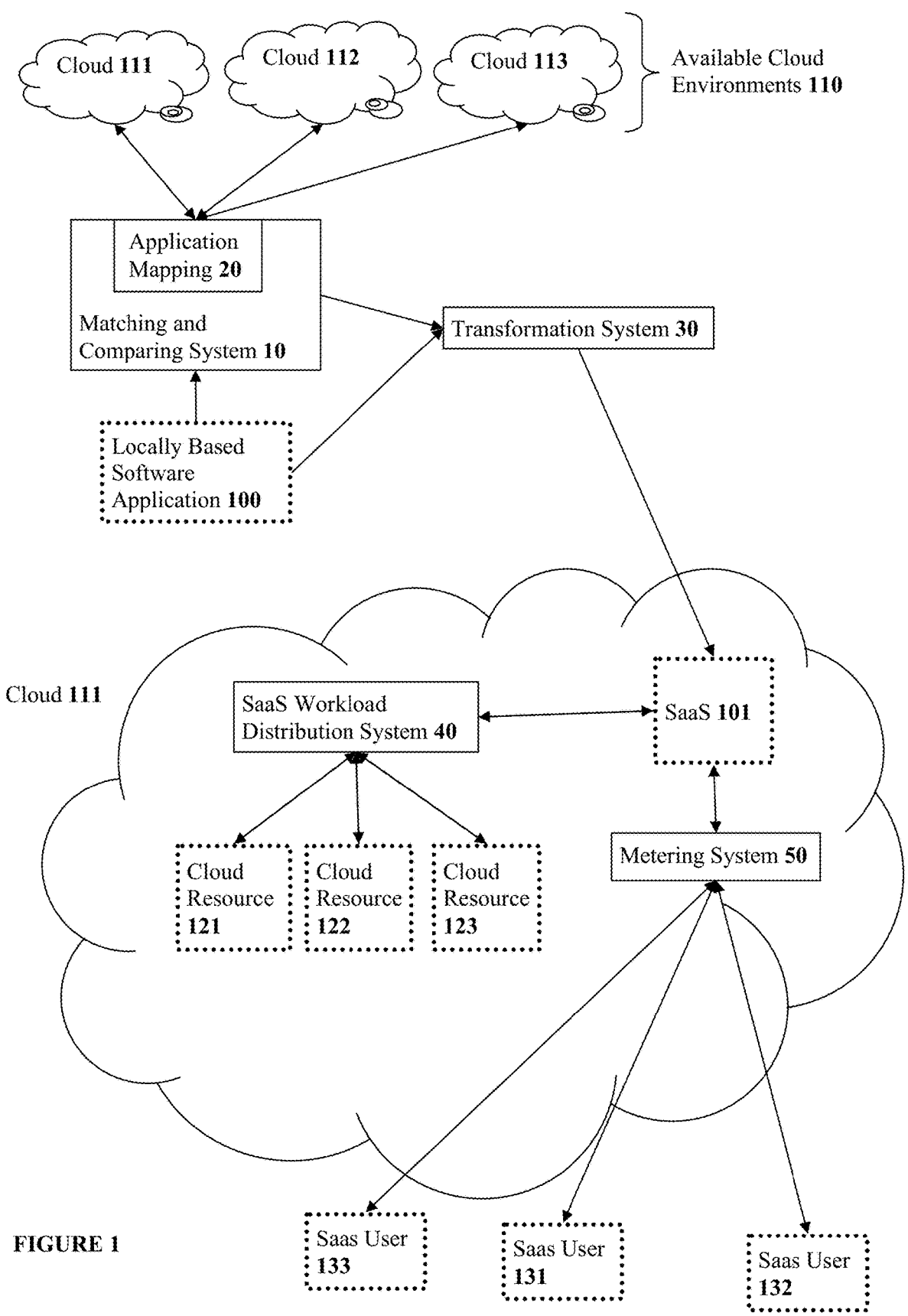
FIG. 1 shows a schematic of the migration of a locally based software application 100 to a cloud environment 111.

The following description includes information that may be useful in understanding the present invention. It is not an admission that any of the information provided herein is prior art or relevant to the presently claimed invention, or that any publication specifically or implicitly referenced is prior art.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Computer devices that are Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The inventive subject matter provides apparatus, systems, and methods in which a metering system measures usage of one or more computer resources in a multi-tenant system.

Various objects, features, aspects and advantages of the inventive subject matter will become more apparent from the following detailed description of preferred embodiments, along with the accompanying drawing figures in which like numerals represent like components.

It should be noted that any language directed to a computer or a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

Here, the multi-tenant computer system is typically embodied by a plurality of engines specifically configured to meter data streams for each tenant of the system, and identify specific information from each data stream, such as which applications each tenant is using, how long each tenant uses each application, peak hours, bandwidth, etc. By specifically monitoring targeted aspects of each data stream, aggregating the data into separate buckets, and creating summarized repots, the system drastically improves the ability for systems to bill specific tenants with a greater accuracy, and/or target the most resource-intensive tenants for throttling. For example, if a tenant uses an application for more than 50 hours per week on average, the system could be configured to throttle the tenant's use of the application by sending an audible notification alarm to the tenant when the tenant reaches 30 hours, 40 hours, and 45 hours, and then could shut off the tenant's access to the application when the tenant reaches a threshold time period, such as 50 hours or 60 hours for that week.

In one embodiment as depicted in FIG. 1, a locally based software application 100 is analyzed by matching and comparing system 10 for migration to available cloud environments 110 comprised of clouds 111, 112, and 113. In order to select a desirable cloud, matching and comparing system 10 scans both software application 100 and clouds 111, 112, and 113, to determine the relevant resource environments and modules. The application mapping system 20 could then map the application modules of software application 100 to on or more of the cloud resources of clouds 111, 112, and 113. Reports from matching and comparing system 10 and/or application mapping system 20 could be provided the user with information that can be used to select a desirable cloud environment from among clouds 111, 112, and 113, or any other available cloud environments.

As used herein, the term "locally based application" means an application that is not currently operating with or within a cloud based environment. Under this definition, an instance of an application is locally based if that instance is not currently operating with or within a cloud based environment, even though another instance of the same or similar software is currently operating with or within a cloud based environment. Also, where an application has both locally based and cloud based modules, the application is considered to be part locally based and part cloud based.

As used herein, the term "cloud based application" means an application that is currently operating at least in part, with or within a cloud based environment.

Available clouds and cloud environments are contemplated to include one or more individual clouds, one or more clouds that overlap among or between each other, and a mixture of one or more individual and overlapping clouds.

Although FIG. 1 depicts only one locally based application 100, any realistic number of locally based applications could be involved. Likewise, although FIG. 1 depicts only three available cloud environments, the involvement of as many or as few cloud environments as realistically possible. Thus, FIG. 1 should be interpreted generically as depicting systems and methods in which one or more locally based software applications, collectively having a plurality of software modules, is matched to one or more available clouds.

Desirability of any particular clouds depends on whatever paradigm is deemed relevant for/by the human or machine user. For example, desirability could be based on a weighing of performance factors (e.g., processor availability and/or capacity, memory availability and/or capacity, power consumption) and/or non-performance factors (e.g., cost, time spent).

Scanning can be accomplished in any suitable manner. For example, scanning of the software application can involve identification of the different modules, and identification of the resources utilized by the various modules, including hardware, libraries and other software, and network resource configurations. Scanning of the cloud or clouds approaches the situation from the opposite perspective by identifying what hardware, software, and network resource configurations are available.

Application mapping compares and groups the requirements of the application modules to the cloud resources. This can be accomplished by assembling one or even a few permutations of maps, but preferably this is accomplished by investigating a large number of permutations of maps. The system then compares the performance and non-performance factors associated with many, or even all, of the various permutations investigated.

Reports can be generated for the user from the comparing and mapping systems. Reports can advantageously provide rankings of the various permutations, recommendations, etc, and in some instances could provide warning of insufficient information or failure of scanning, mapping, matching or comparing algorithms. Reports can be presented in any suitable format, in charts, tables, in printed format, dynamic or static GUIs, etc.

Continuing on with the description of the embodiment depicted in FIG. 1, the human or machine user could select a cloud environment from the available cloud environments as the destination for the migration of software application 100, here cloud 111. Transformation system 30 then analyzes the application modules of software application 100, and transforms one or more of the modules and/or application environment contexts of the modules to interface with tenancy, operations, and/or business engines in the cloud environment 111. In some embodiments this creates a copy of locally based software application 100 to be operated as SaaS 101 in cloud 111.

In order to transform locally based software applications into SaaS capable applications, it is helpful to analyze the locally based software application, preferably including the application environment context. This analysis can be accomplished in any suitable manner. For example, analysis of the application can involve identifying from the one or more modules within the application which module or modules should be transformed to offer tenancy, operations, and/or business services.

The transformation of locally based software applications into SaaS capable applications can also be accomplished in any suitable manner. For example, information identifying which application modules should be transformed to offer tenancy, operations, and business services in the cloud can be used to add tags, agents, and application programming interface ("API") calls to those services, making the locally based application into a SaaS capable application.

In some contemplated instances the transformation involves modification of the application, and in other contemplated instances transformation involves modification of the application environment context. For example, regarding transformation of a non-tenant aware application to an application that operates with multiple tenants, one could modify the application according to teachings of WO2008042984 (Hofhansl) and US20100005055 (An), or modify the application environment context according to teachings of U.S. Pat. No. 8,326,876 (Venkatraman) or US2010/0005443 (Kwok). Co-owned U.S. Pat. No. 8,326, 876 (Venkataraman) also discloses multi-tenant agile database connectors that could be used to transform a locally-based application into a multi-tenant application system.

These and all other publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The interfacing between the SaaS capable application and the tenancy, operations, and business capabilities of the cloud environment can be accomplished in any suitable manner. For example, links can be created between the SaaS capable application modules and the tenancy, operations, and business capabilities of the cloud environment. In a subset of this embodiment, the links can be managed by a SaaS runtime engine in the cloud. In a further subset of this embodiment, the tenancy, business, and operations services in the cloud can be delivered to the SaaS capable application via at least one service engine, each of which can operate through the SaaS runtime engine.

In FIG. 1 the SaaS workload distribution system 40 analyzes the workloads of SaaS 101, groups interrelated workloads together in partitions, and can assign the partitions to be executed by cloud resources from among, for example, cloud resources 121, 122, and 123.

The analysis of SaaS capable applications to detect workloads can be accomplished in any suitable manner. In one embodiment of the inventive subject matter, a scan of software applications identifies various workloads and other software components in the applications, as well as the dependencies, interdependencies, independencies, and other relationships between and among various software components and the environment in which the application operates, including application servers, databases, operating systems, hardware configurations, external software, hardware interfaces, and other aspects of the application environment.

As used herein, the term "workload" means an independently executable software sub-unit on a computing hardware. A workload can therefore be comprised of one or more modules, and a workload can use one or more other workloads in order to function as an independent software system. Modules comprising a workload can be independently executed on any computation instance, element, unit, or other computer resource.

The division of workloads into partitions can be performed in any suitable manner. For example, a human or machine user can set parameters to govern the mapping and/or assignment of software application workloads into partitions. The parameters for partitioning can be based on efficient use of cloud resources, low cost operation of the application, heightened performance of the application, or other user desired results. In one embodiment of the inventive subject matter, workloads are grouped into partitions based on module characteristics and relations between and among various workloads and aspects of the application environment. In addition, the workloads of a single application can be mapped and/or assigned to multiple partitions or groups of partitions, representing as many or as few partition permutations as is possible or desired by the user. Further, the workloads of more than one software application can be mapped and/or assigned into multiple partitions or groups of partitions in the same or similar manner.

The mapping and/or assignment of partitions to computation instances, elements, units, or other cloud resources can be accomplished in any suitable manner. For example, any realistic number of few partitions or groups of partitions can be mapped and/or assigned to any realistic number of cloud resources, as desired by the user. And the cloud resources can be present in any number of cloud environments. Still further, these mapping permutations can be stored for future reference.

As shown in FIG. 1, use by SaaS users 131, 132, and 133 of SaaS 101 and cloud resources 121, 122, and 123 is monitored by metering system 50. Metering system 50 sends notices, alerts, bills, and/or other use-based information to each of SaaS users 131, 132, or 133, or the group of SaaS users, or any grouping of SaaS users, based on their actual use of SaaS 101 and/or the resources of cloud 111. This is quite different from existing systems in which SaaS services use block billing.

It is contemplated by the current inventors that the metering system 50 is capable of monitoring the use of any realistic number of SaaS applications by any realistic number of users across any realistic number of cloud environments, desired by a user.

Examples of a user's use of software application and cloud resources can include, among other things, use of billable resources such as computer, storage, power, processor time network resources, and other physical resources of the cloud. Additionally or alternatively, billable resources can include the run time of the software application, the data streams coming from applications, the number of users, the number of concurrent users and access of those users, the features of software applications that are accessed by the user or users, the user or users access to databases, the file system utilized, messaging and associated resources utilized by the software application, and other SaaS characteristics.

Use of software applications and cloud resources can be monitored by any suitable means. For example, a tenant identity manager and an application identity manager, or combination of the two, can be used to resolve, distinguish, separate, and/or otherwise monitor the data streams coming from one or multiple SaaS applications and from one or multiple tenants. The monitored data streams may be quantized based on rules.

The quantized data can be used to generate notices and/or reports for an administrator of the metering system and/or the user or users of the SaaS applications. Such notices and/or reports can be presented in charts, tables, printed format, dynamic or static GUIs, letters, memos, invoices, display notes, chimes, display pop-ups, email, audio message, or any other suitable fashion, and can be delivered to an administrator and/or user of SaaS applications via hard copy, text message, email, phone call, instant message, letter, or by any other suitable means.

A SaaS application and its environment is preferably be monitored through agents installed within the application and the environment in which the SaaS application is functioning.

Figure 2:
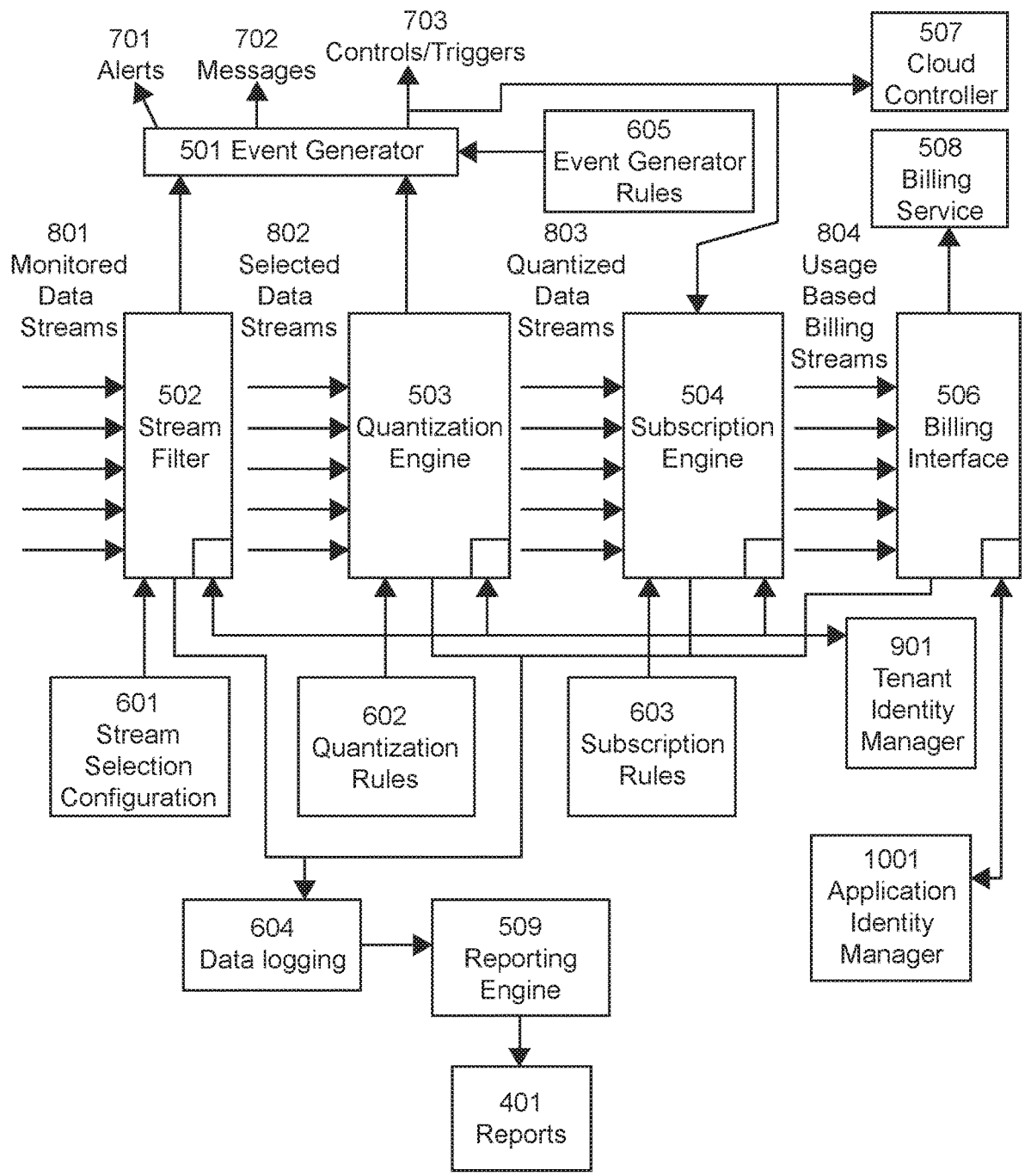
FIG. 2 shows a schematic of a metering platform that measures data from multiple SaaS applications and resources, and translates the data into usage based billable entries for every tenant.

In the particular billing example 500 of FIG. 2, agents from multiple SaaS applications deliver continuous streams of data 801 for monitoring, which is consumed by the SaaS-meter to perform metering of application resources for the purpose of billing its usage. Each agent could be installed on a separate system, and preferably the system installs at least one agent on each application of the multi-tenant system and/or installs at least one agent on each multi-tenant system that provides access to the applications.

Stream filter 502 receives a plurality of streams as monitored data stream 801 from one or more SaaS applications (e.g. via agents) and/or from their operating environments. In some embodiments, the system could monitor all data streams from each SaaS application, and in other embodiments a user could be provided with a user interface, through which the user could select a subset of monitored data streams 801 for monitoring. Stream selection configuration 601 holds saved configuration data received by an administrative user interface which could be used by stream filter 502 to select a portion of monitored data streams 801 to analyze. Aspects of each of these monitored streams are preferably logged into a database 604. For example, each data stream could be monitored for when the stream was initiated, when the stream finished, how much data was transmitted from the tenant computer to the multi-tenant system and vice-versa during the time period, which application was used, peak usage times, etc. The selected streams are sent to the next stage, the quantization engine 503, which processes the data from the selected data streams 802.

Quantization rules holds rules that are used to create quantized data streams 803. Exemplary quantized rules include rules that quantify which aspects of each of selected data stream 802 is aggregated and saved into which bucket. Such quantization rules are preferably imported as a template, or are defined by an administrator user through a user interface. Using the rules for quantization from the database 602, the quantization engine creates quantized data streams 803 for use by the subscription engine 504. Exemplary quantization rules include, for example, gathering all usage data for a single user over a day, month, and/or week period of time into a single bucket, to analyze data trends for that user. Or gathering all usage data for a single user when throughput of the data exceeds over 500 GB per hour for a single application into a single bucket.

Based on the rules for subscription management specified in the database 603, the subscription engine 504 sends the necessary data streams 804 to the billing interface 506, which interfaces with the billing services 508. The subscription rules 603 are also generally defined by an administrator user through a user interface. Exemplary subscription rules include, for example, determining whether a user has exceeded subscription thresholds, or determining whether an application has been utilized by over a threshold number of tenants.

The different stages in the data stream flow through stream filter 502, quantization engine 503, subscription engine 504 and billing interface 506 resolve the identity of tenant by using the services of tenant identity manager 901 and identify the application using application identity manager 1001.

As they process the data streams, each engine preferably logs the data into a data logging database 604.

Dashboards, analytics, or reports 401 can be generated through reporting engine 509.

As the rules are applied by each of the stream filter 502 and quantization engine 503, controls are triggered and sent to event generator 501 that sends out alerts 701, messages 702 and control/trigger signals 703 based on the rules defined in event generator rules 605.

The controls can be used to control external services such as cloud controller 507 and billing service 508 through the event generator 501 and billing interface 506 respectively.

Figure 3:
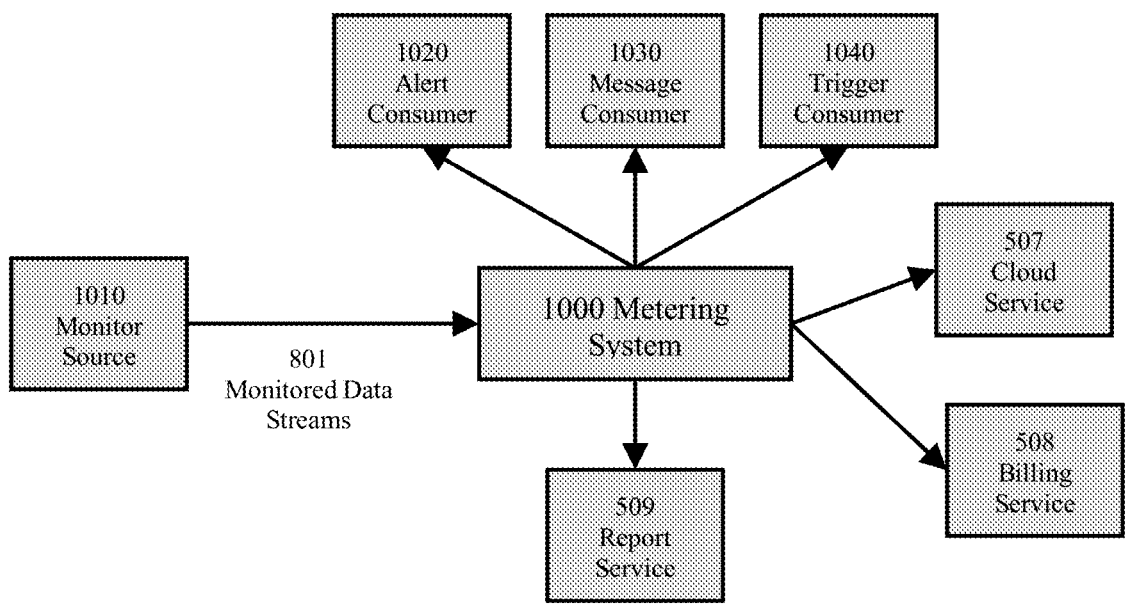
FIG. 3 shows a schematic of a metering platform that monitors external event consumers.
Figure 4:
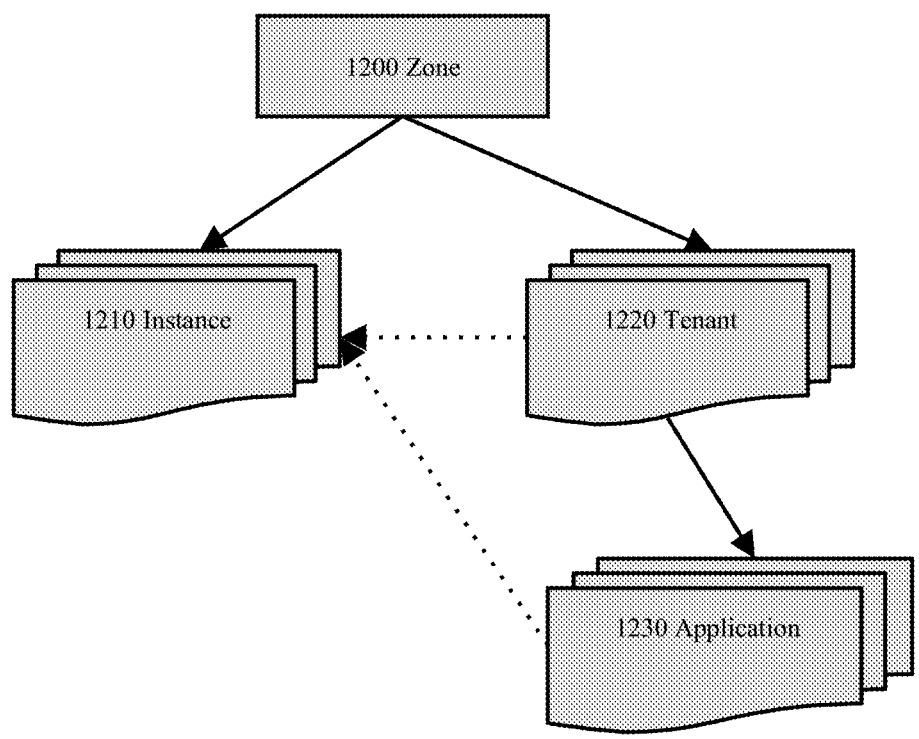
FIG. 4 shows a schematic of a zone.

FIG. 3 discloses an exemplary metering system 1000, which receives data from a monitor source 1010, and sends data from that metering system to consumers, such as alert consumer 1020, message consumer 1030, or trigger consumer 1040. Metering system 1000 could also transmit various summaries to a cloud controller 507, billing service 508, and/or report service 509. Metering system 1000 monitors zone 1200, shown in FIG. 4. Zone 1200 has a plurality of tenants, such as tenant 1220, accessing one or more applications, such as application 1230, in a multi-tenant system. Every time tenant 1220 uses an application, a separate instance of the application is created, such as instance 1210. In any multi-tenant system, a plurality of instances could be created, at least one for each tenant. Preferably, each instance transmits a stream of data which is monitored by metering system 1000, which analyzes data about each instance and logs it.

The metering system 1000 could interact with external event consumers 1020, 1030, 1040, 507, 508, and 509, in a prescribed model, as explained in the following sections.

The monitor source 1010 is configured to send monitored data streams 801 to the metering system 1000, for example monitored data streams 801, with either an identity of instance 1210, as some form of unique number or string, or application 1230 with tenant 1220 identity, again as some form of unique number or string. Every Instance in monitor source 1010 is associated with a zone 1200, and every zone 1200 is associated with one or more tenants 1220. Each tenant 1220 is further associated with one or more applications 1230. In some embodiments, the instance 1210 can be uniquely mapped with a tenant 1220 or even an application 1230, and in which case instance's monitored data streams 801 will also allow metering of the tenant and its application.

Each monitored data stream 801 is generally transmitted to metering system 1000 with an identity of the instance 1210, which is then identified by the zone identity manager 910. When the monitored data streams 801 arrive with application 1230 identity and tenant 1220 identity, to the metering system 1000, the metering is done for the appropriate tenant 1220 and the application 1230, as identified by the tenant identity manager 901 and application identity manager 1001. In other words, the data stream is labeled with the identity of the application invoked in the instance, and the identity of the tenant who invoked the application in the instance, and is saved in an appropriate database. The zone identity manager 901 could be configured with the zone 1200 to instance 1210 mapping to ensure that the zone identity manager 901 is able to do the appropriate metering operations. Similarly the tenant identity manager 901 and application identity manager 1001 are configured with application 1230 to tenant 1220 mapping, to ensure that appropriate metering operations are performed based on the incoming monitored data streams 801.

The alert consumer 1020 and the message consumer 1030 can be any email server or SMS server or GUI rendering systems which can be triggered to push appropriately formed message for either the end user consumption or to interface with other external systems. The trigger consumer 1040 can be any generic webhook-like system, which can be triggered by the metering system 1000 when an appropriate predefined events occurs.

The cloud controller 507 is any system that manages instances 1210 that are monitored by the metering system 1000. The metering system 1000 can be configured, and hence can trigger, the cloud controller 507, so as to provision, deprovision and/or reconfigure the instances 1210. Such triggers are generally initiated, for example, when the system detects a user or an application bucket exceeding a threshold. For example, this capability can be used for auto-scaling, where if the monitored data streams 801 are for the CPU load of the managed instances 1210, an administrative user could configure the metering system 1000 to trigger the cloud controller 507 to provision new instance 1210 with appropriate settings to handle the extra load that is sent in the incoming monitored data streams 801 when the load exceeds a threshold amount.

The billing service 508 could be a system that manages end user billing. The metering system 1000 can be configured to trigger the billing service 508 to do the appropriate billing changes to the appropriate tenant 1210 based on predefined subscription rules 603. For instance, the end user of a tenant 1220 can be billed with extra charges, when he/she performs more uploads than allowed by their preset quota. (e.g. exceeds a predetermined threshold) Such thresholds are generally saved in subscription rules 603.

The reporting engine 509 could be a system that accesses logged data 604 stored inside the metering system 1000 and renders it in a user friendly layout and look and feel as configured. For instance, it is possible to configure and render a graph on CPU load over time, for a given instance.

The monitored data streams 801 coming from the monitor source 1010 can be configured using stream selection configuration 601 to log information into into the data logging database 604, and/or can also be configured to compress data by aggregating over different aggregator functions like SUM, AVERAGE, COUNT, and STDDEV, into different time based buckets like HOURLY, DAILY, WEEKLY, and MONTHLY which again can be stored in the data logging.

Figure 5:
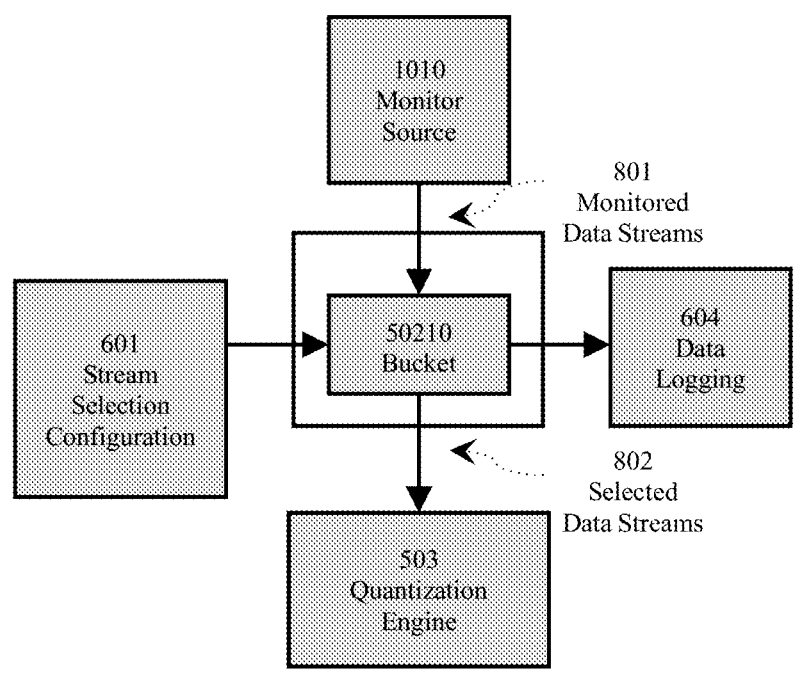
FIG. 5 shows a schematic of a bucket aggregator.

In some embodiments, the aggregation could be performed by a bucket module, such as bucket module 50210 shown in FIG. 5. Monitor source 1010 saves data analyzed by monitored data streams 801 into bucket 50210, which holds all data from all monitored data streams 801. The aggregation is performed by the bucket aggregator 50210 subsystem of the stream filter 502.

The stream selection configuration 601 system can be configured to log only selected data streams, for example using Boolean conditional expressions over the fields of the monitored data streams 801, out of all that comes from monitor source 1010. The data logging 604 can also be periodically backed up or archived for better reliability and performance.

The quantification rules 602 can also be an aggregator functions like SUM, AVERAGE, COUNT, and STDDEV, which can act upon the selected data streams 802, and thus increase the signal to noise ratio of the interesting data streams. These rules are enforced by the quantization engine 503.

The subscription rules 603 can be configured to map which tenant 1220 is associated with which application 1230 and optionally which instance 1210. The quantization engine 503 uses the subscription rules 603 to appropriately trigger the external billing interface 506.

The event generator rules 605 can be configured with Boolean conditional expressions as to when an event has to be raised by the event generator 501, based on the incoming monitored data streams 801 and the and selected data streams 802. The events raised by event generator 501 is consumed or acted upon by event consumers 1020, 1030, 1040, 507, 508, and 509.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for measuring usage of at least one computer resource within a multi-tenant system, comprising:
   a metering engine configured to monitor a plurality of data streams of the multi-tenant system;
   an identity engine configured to identify a first user who initiated a portion of the plurality of data streams from a group of users comprising the first user and a second user;
   a bucket aggregator configured to aggregate activity from the first user as a function of the portion of the plurality of data streams to create a total activity aggregate of the first user;
   a subscription engine configured to generate a summary of the total activity aggregate of the first user;
   a throttling engine configured to limit access of at least one of the first user and the second user to a first zone when the total activity aggregate of all instances that belong to the first zone exceeds a threshold;
   wherein the metering engine, the identity engine, the bucket aggregator, the subscription engine, and the throttling engine comprise stored program instructions embedded in a non-transitory computer readable storage medium, and
   wherein the stored program instructions are executed by a computer processor.

2. The system of claim 1, wherein the throttling engine is configured to limit an access of the first user to the multi-tenant system when a portion of the aggregated activity exceeds the threshold.

3. The system of claim 1, wherein the throttling engine is configured to limit an access of based on at least one of a failure of a user to pay a bill on time, a failure of a user to comply with a security protocol, and a failure to comply with a use restriction.

4. The system of claim 1, further comprising an identity database configured to store an identity of each user in the group of users.

5. The system of claim 4, further comprising a quantification engine configured to aggregate activity from only the selected subset of the portion of the plurality of data streams to create a subset activity aggregate of the first user.

6. The system of claim 1, further comprising a stream selection engine configured to select a subset of the portion of the plurality of data streams for logging.

7. The system of claim 6, wherein the subscription engine is further configured to generate a summary of the subset activity aggregate of the first user and wherein the rendering engine is configured to present a representation of the subset activity aggregate of the first user.

8. The system of claim 1, wherein the identity engine is further configured to identify an application for each data stream of the portion of data streams.

9. The system of claim 1, further comprising a notification engine configured to provide notifications to users regarding at least one of a cloud resource status, a comparative resource usage metric, a comparative operational feature metric, and a billing error.

10. The system of claim 9, wherein at least one of the comparative resource usage metric and the comparative operational feature metric are calculated based on local operations and cloud operations.

* * * * *